United States Patent
Wang

(10) Patent No.: US 8,271,199 B2
(45) Date of Patent: Sep. 18, 2012

(54) BINNING METHOD FOR BOREHOLE IMAGING

(75) Inventor: Tsili Wang, Katy, TX (US)

(73) Assignee: Smith International, Inc., Houston, TX (US)

(*) Notice: Subject to any disclaimer, the term of this patent is extended or adjusted under 35 U.S.C. 154(b) by 332 days.

(21) Appl. No.: 12/651,040

(22) Filed: Dec. 31, 2009

(65) Prior Publication Data

US 2011/0161009 A1    Jun. 30, 2011

(51) Int. Cl.
G06F 19/00 (2011.01)
G01V 9/00 (2006.01)

(52) U.S. Cl. .................................................. 702/9

(58) Field of Classification Search ........ 702/9; 367/31; 166/250.01; 324/339
See application file for complete search history.

(56) References Cited

U.S. PATENT DOCUMENTS

| | | |
|---|---|---|
| 4,562,556 A | 12/1985 | Ingram et al. |
| 4,642,648 A | 2/1987 | Hulland et al. |
| 5,023,450 A | 6/1991 | Gold |
| 5,045,795 A | 9/1991 | Gianzero et al. |
| 5,184,079 A | 2/1993 | Barber ........................... 324/339 |
| 5,235,285 A | 8/1993 | Clark et al. |
| 5,339,036 A | 8/1994 | Clark et al. |
| 5,357,797 A | 10/1994 | Maki, Jr. et al. |
| 5,422,480 A | 6/1995 | Schultz |
| 5,461,562 A | 10/1995 | Tabanou et al. ................. 702/11 |
| 5,473,158 A | 12/1995 | Holenka et al. |
| 5,486,695 A | 1/1996 | Schultz et al. |
| 5,506,769 A | 4/1996 | Fu et al. |
| 5,513,528 A | 5/1996 | Holenka et al. |
| 5,591,967 A | 1/1997 | Moake |
| 5,672,867 A | 9/1997 | Gadeken et al. |
| 5,675,488 A | 10/1997 | McElhinney |
| 5,680,906 A | 10/1997 | Andrieux et al. |
| 5,899,958 A | 5/1999 | Dowell et al. |
| 5,966,013 A | 10/1999 | Hagiwara |
| 6,023,658 A | 2/2000 | Jeffryes |
| 6,131,694 A | 10/2000 | Robbins et al. |
| 6,307,199 B1 | 10/2001 | Edwards et al. |
| 6,321,456 B1 | 11/2001 | McElhinnney |
| 6,326,784 B1 | 12/2001 | Ganesan et al. ............... 324/303 |
| 6,476,609 B1 | 11/2002 | Bittar |
| 6,509,738 B1 | 1/2003 | Minerbo et al. |

(Continued)

FOREIGN PATENT DOCUMENTS

EP     0084001 B1     3/1991

(Continued)

OTHER PUBLICATIONS

Oppenheim, A. V. and Schafer, R.W., "Digital Signal Processing", Prentice-Hall, 1975, pp. 239-250 and pp. 548-554.

Primary Examiner — Bryan Bui
(74) Attorney, Agent, or Firm — Darla Fonseca; Brigitte Echols; Charlotte Rutherford

(57) ABSTRACT

A method for forming a borehole image includes fitting logging sensor measurements residing in each of a plurality of azimuthal windows with corresponding mathematical fitting functions. The functions may then be evaluated at one or more corresponding azimuthal positions to obtain at least one sector value for each of the azimuthal windows. A two dimensional borehole image may be formed by repeating the procedure at multiple measured depths in the borehole.

22 Claims, 3 Drawing Sheets

U.S. PATENT DOCUMENTS

| | | |
|---|---|---|
| 6,510,106 B2 | 1/2003 | Hudson |
| 6,584,837 B2 | 7/2003 | Kurkoski |
| 6,619,395 B2 | 9/2003 | Spross |
| 6,819,111 B2 | 11/2004 | Fanini et al. |
| 6,911,824 B2 | 6/2005 | Bittar |
| 6,969,994 B2 | 11/2005 | Minerbo et al. |
| 7,019,528 B2 | 3/2006 | Bittar |
| 7,027,926 B2 | 4/2006 | Haugland |
| 7,057,392 B2 | 6/2006 | Wang et al. |
| 7,138,803 B2 | 11/2006 | Bittar |
| 7,202,670 B2 | 4/2007 | Omeragic et al. |
| 7,250,768 B2 | 7/2007 | Ritter et al. |
| 7,265,552 B2 | 9/2007 | Bittar |
| 7,375,530 B2 | 5/2008 | Chemali et al. |
| 7,382,135 B2 | 6/2008 | Li et al. |
| 7,403,857 B2 | 7/2008 | Haugland |
| 7,414,405 B2 | 8/2008 | Moore |
| 7,414,407 B2 | 8/2008 | Wang et al. |
| 7,558,675 B2 * | 7/2009 | Sugiura .................. 702/9 |
| 2008/0290873 A1 | 11/2008 | Homan et al. |
| 2009/0015261 A1 | 1/2009 | Yang et al. |
| 2011/0074428 A1 * | 3/2011 | Wang .................. 324/339 |

FOREIGN PATENT DOCUMENTS

| | | |
|---|---|---|
| EP | 0981062 A2 | 2/2000 |
| EP | 0793000 | 4/2001 |
| EP | 0663511 B1 | 7/2002 |
| GB | 2301438 | 4/1996 |
| GB | 2402489 A | 8/2004 |

* cited by examiner

BINNING METHOD FOR BOREHOLE IMAGING

RELATED APPLICATIONS

None.

FIELD OF THE INVENTION

The present invention relates generally to a method of forming images of a subterranean borehole. More specifically, this invention relates to an improved method for binning logging sensor measurements.

BACKGROUND OF THE INVENTION

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times six or more) sensors extending outward from the tool into contact (or near contact) with the borehole wall. It will be appreciated by those of ordinary skill in the art that such wireline arrangements are not suitable for typical logging while drilling (LWD) applications. In particular, communication bandwidth with the surface would typically be insufficient during LWD operations to carry large amounts of image-related data. Further, LWD tools are generally not centralized or stabilized during operation and thus require more rugged sensor arrangements.

LWD tools commonly make use of the rotation (turning) of the tool (and therefore the LWD sensors) in the borehole to obtain measurements in multiple azimuthal directions. Depending on the sampling interval and the total sampling time, a large volume of data may result that spans substantially the entire azimuthal range. Due in large part to the limited conventional communication bandwidth between a BHA and the surface, as well as limited conventional downhole data storage capacity, the sensor data must typically undergo significant quantity reduction. This process of data reduction is sometimes collectively referred to in the art as binning or sectorization.

For example, U.S. Pat. No. 5,473,158 to Holenka et al discloses a method in which sensor data (e.g., neutron count rate) is grouped by quadrant about the circumference of the borehole. U.S. Pat. Nos. 6,307,199 to Edwards et al and 6,584,837 to Kurkoski disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on. U.S. Pat. No. 6,619,395 to Spross discloses a methodology in which each sensor measurement is mathematically weighted based on a standoff measurement. This weighted data is then binned as described above.

While binning techniques, such as those described above, have been utilized in commercial LWD applications, both real-time and memory LWD images are often coarse or grainy (and therefore of poor quality) and in need of improvement. For example, when the number of bins is small (e.g., quadrants or octants), conventional binning strongly distorts the high-frequency components of the data, which can result in aliasing. When the number of bins is large (e.g., 32 or more), there may not be enough data points for each bin to generate a stable (low noise) output.

Commonly assigned U.S. Pat. Nos. 7,027,926 and 7,403,857 to Haugland disclose a technique in which LWD sensor data is convolved with a one-dimensional window function or a predetermined mathematical filter. This approach advantageously provides for superior image resolution and noise rejection as compared with the previously described conventional binning techniques and in particular tends to reduce the aforementioned aliasing problem. While such "windowing" techniques represent a significant advantage over conventional binning, there remains a need for further improved methods of forming LWD borehole images.

SUMMARY OF THE INVENTION

The present invention addresses one or more of the above-described drawbacks of prior art borehole imaging techniques. Aspects of this invention include a method for making logging sensor measurements and forming a borehole image of a subterranean formation. In one embodiment, logging sensor measurements and corresponding azimuth angles are acquired during drilling while an LWD tool rotates in a borehole. The sensor measurements residing in each of a plurality of azimuthal windows are fit with corresponding mathematical fitting functions (e.g., first or second order polynomials). The functions are then evaluated at one or more corresponding azimuthal positions to obtain at least one sector value for each of the azimuthal windows. A two dimensional borehole image may be formed by repeating the procedure at multiple measured depths in the borehole.

Exemplary embodiments of the present invention may advantageously provide several technical advantages. For example, methods in accordance with the present invention tend to provide a more accurate representation of the logging sensor data than does conventional binning. This is especially the case when the logging sensor data is not uniformly distributed in azimuth (e.g., clustered into a plurality of azimuthal groups).

Methods in accordance with the present invention also tend to provide a more accurate representation of the logging sensor data when the sensor data within a single sector has a non-linear dependence on azimuth. Such nonlinearity commonly occurs when a small number of azimuthal sectors (or bins) are utilized. Therefore the invention may be particularly advantageous in borehole imaging applications utilizing a small number of azimuthal sectors (such as in applications in which the data are transmitted to the surface in substantially real time during drilling).

Exemplary methods in accordance with the present invention may also advantageously reduce noise in the sensor measurements when the number of measurements falling within an azimuthal sector is small. The flexibility in the selection of a fitting window width makes it possible to include more sensor measurements by increasing the width of the window. For example, in the extreme case in which only one sensor measurement falls in an azimuthal sector, the window width may be increased to include more measurements from adjacent azimuthal regions and therefore may significantly reduce the uncertainty in the calculated sector value as compared to the use of only one measurement.

In one aspect the present invention includes a method for forming an image of a logging sensor measurement. A downhole tool including at least one logging sensor and at least one azimuth sensor is rotated in a subterranean borehole. A plurality of data pairs is acquired using the at least one logging sensor and the at least one azimuth sensor. Each of the data pairs includes a logging sensor measurement and a corresponding azimuth. The data pairs that reside in each of a plurality of predetermined azimuthal windows are fit with a corresponding mathematical fitting function. The fitting functions are evaluated at corresponding azimuthal positions to obtain corresponding sector values for each of the azimuthal positions.

In another aspect, the invention includes a logging while drilling tool. At least one least one logging while drilling sensor and at least one azimuth sensor are deployed on a logging while drilling tool body. A controller is configured to (i) cause the tool to acquire a plurality of data pairs while rotating in a subterranean borehole, each data pair comprising a logging sensor measurement and a corresponding azimuth angle; (ii) fit the data pairs that reside in each of a plurality of predetermined azimuthal windows with a corresponding fitting function; and (iii) evaluate the fitting functions generated in (ii) at corresponding azimuthal positions to obtain corresponding sector values for each of the azimuthal positions.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
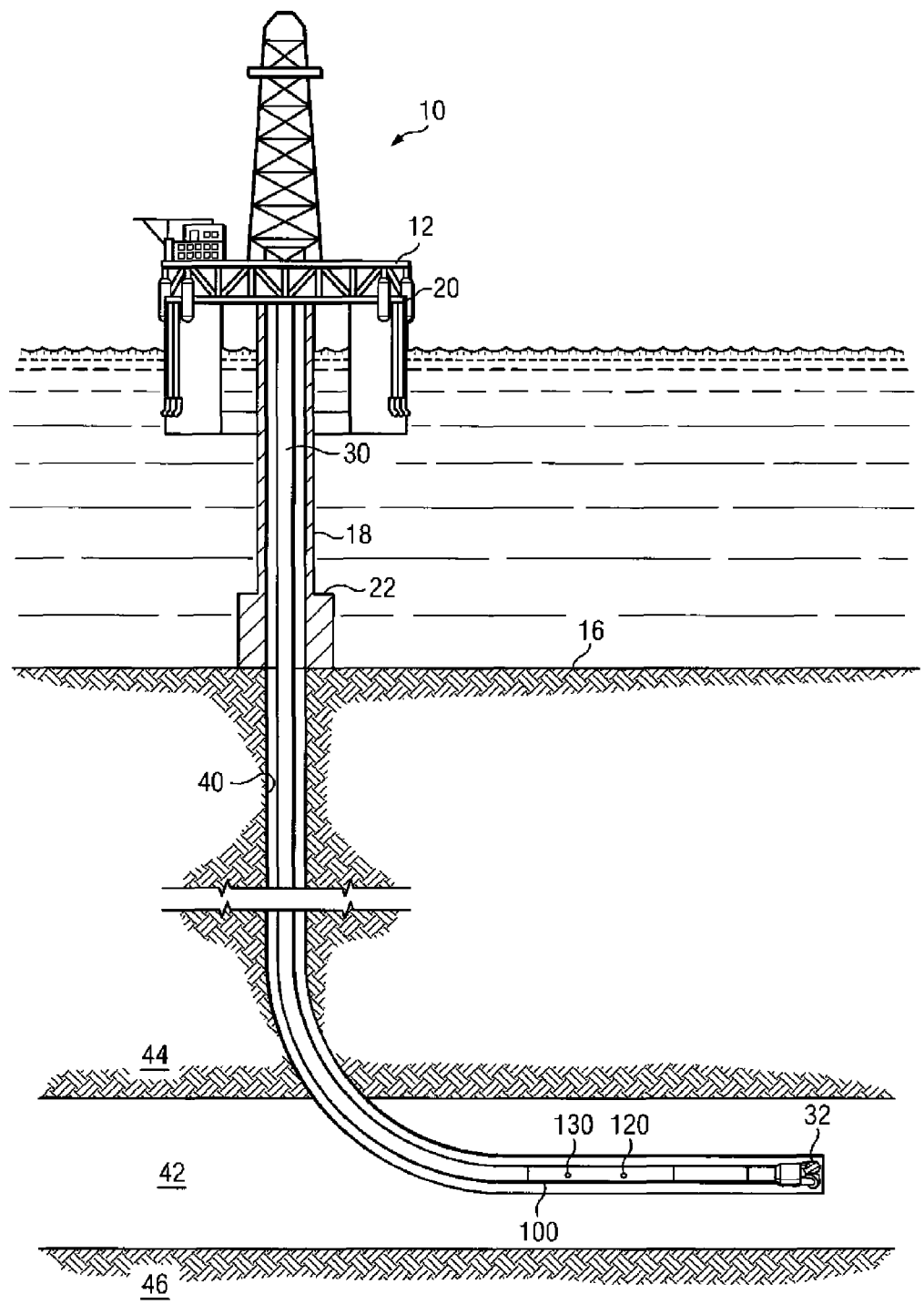
FIG. 1 depicts a conventional drilling rig on which exemplary method embodiments of the present invention may be utilized.

FIG. 1 schematically illustrates one exemplary embodiment of a logging while drilling tool 100 suitable for use with the present invention in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and LWD tool 100. LWD tool 100 typically includes at least one LWD sensor 120 and an azimuth sensor 130 deployed thereon.

LWD sensor 120 may include substantially any downhole logging sensor, for example, including a gamma ray sensor, a neutron sensor, a density sensor, a directional resistivity sensor, a micro-resistivity sensor, a physical or ultrasonic caliper sensor, a formation pressure sensor, an annular pressure sensor, an ultrasonic sensor, an audio-frequency acoustic sensor, and the like. LWD sensor 120 is configured, as is known to those of ordinary skill in the art, to measure borehole parameters including formation density, formation resistivity, formation acoustic velocity, gamma ray interaction cross section, neutron interaction cross section, caliper interaction cross section, and the like.

Azimuth sensor 130 (also referred to in the art as an orientation sensor) may include substantially any sensor that is sensitive to the rotational orientation of the tool 100 in the borehole, such as one or more accelerometers, magnetometers, and/or gyroscopes. In one exemplary embodiment, a high frequency magnetic surveying device may be utilized, such as disclosed in commonly assigned U.S. Pat. No. 7,414,405, however, it will be understood that the invention is not limited to any particular azimuth sensor configuration. In the embodiment depicted on FIG. 1, the azimuth sensor 130 is depicted on (or in) the resistivity tool. It will be appreciated that the invention is not limited in this regard as the azimuth sensor may be deployed substantially anywhere in the BHA.

It will be understood by those of ordinary skill in the art that the term "azimuth" as used herein refers to an angular measurement about the circumference of the tool 100. In particular, azimuth refers to the angular separation between a point of interest and a reference point. The azimuth is typically measured in the clockwise direction (although the invention is not limited in this regard), and the reference point is frequently the high side of the borehole or measurement tool, relative to the earth's gravitational field, or magnetic north. Another important label used in the borehole imaging context is the "toolface" angle. When a measurement tool is used to gather azimuthal imaging data, the circumferential point of the tool with the measuring sensor (the logging sensor) is identified as the "face" of the tool. The tool face angle, therefore, is defined as the angular separation about the circumference of the tool between a reference point and the face of the tool. In the remainder of this document, the terms azimuth and toolface will be used interchangeably, though the azimuth identifier will be used predominantly.

With continued reference to FIG. 1, LWD tool 100 typically further includes a controller (not shown), e.g., having a programmable processor (not shown), such as a microprocessor or a microcontroller and processor-readable or computer-readable program code embodying logic. A suitable processor may be utilized, for example, to construct images (as described in more detail below with respect to FIGS. 2 and 3) of the subterranean formation based on logging sensor measurements and corresponding associated azimuth and/or measured depth information. Images of the earth formation may be indicative of the physical properties of the formation and/or the location of a remote bed or boundary layer. A suitable controller may also optionally include other controllable components, such as sensors (e.g., a depth sensor), data storage devices, power supplies, timers, and the like. The controller may also be disposed to be in electronic communication with sensors 120 and 130. A suitable controller may also optionally communicate with other instruments in the drill string, such as, for example, telemetry systems that communicate with the surface. A typical controller may further optionally include volatile or non-volatile memory or a data storage device. Alternatively, the acquired raw sensor data (or pre-processed data) may be sent to the surface, for example, via a high-speed wired drill string and then processed in accordance with the present invention at the surface.

Those of ordinary skill in the art will appreciate that drill string 30 on FIG. 1 may include other downhole tools, for example, including a downhole drill motor, a mud pulse telemetry system for communicating with the surface, and other logging and/or measurement while drilling tools (such as surveying tools and other LWD tools), formation sampling tools, drill string steering tools, and the like. It will also be understood by those of ordinary skill in the art that the present invention is not limited to use with a semisubmersible platform 12 as illustrated in FIG. 1. The present invention is equally well suited for use with any kind of subterranean drilling operation, either offshore or onshore. The invention is also well suited for certain wireline logging operations.

In the development of subterranean reservoirs, drilling operators commonly attempt to drill a section of the borehole at a predetermined distance from a bed boundary or a fluid contact within the reservoir. With continued reference to FIG. 1, LWD images are commonly utilized to provide information about remote geological targets not intercepted by the measurement tool (e.g., the location of remote beds 44 and 46). Such information may include, for example, the distance and direction to the remote target. The LWD images may also be utilized to provide information about the physical properties of the near-bed 42 (the bed in which tool 100 resides).

Figure 2:
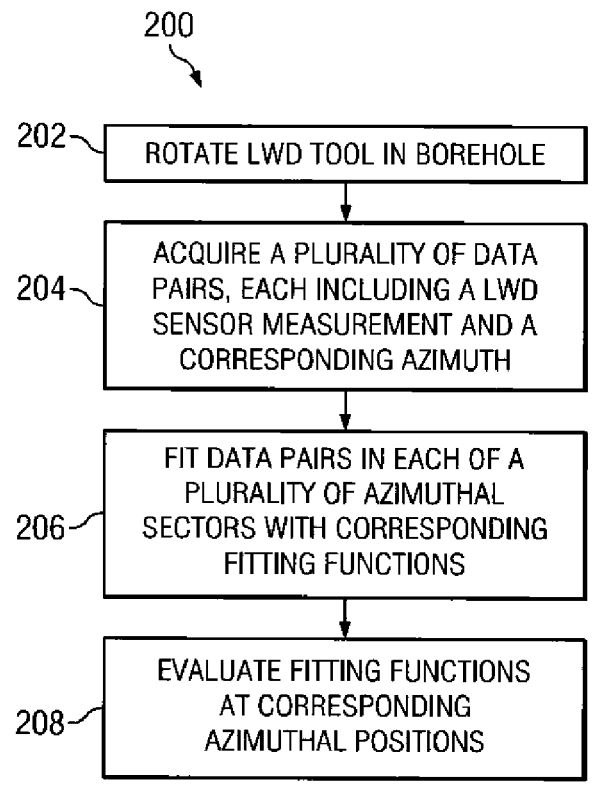
FIG. 2 depicts a flowchart of one exemplary method embodiment in accordance with the present invention.

Turning now to FIG. 2, one exemplary method embodiment 200 in accordance with the present invention is illustrated. An LWD tool having at least one LWD sensor may be rotated in a borehole at 202 (e.g., via rotating drill string 30 in borehole 42 shown on FIG. 1). A plurality of data pairs are acquired at 204 as the tool rotates in the borehole. Each data pair includes an LWD sensor measurement and a corresponding azimuth angle. The plurality of data pairs may be acquired at substantially a single measured depth (or during a predetermined time interval) as the tool rotates in the borehole. The sensor measurements may include, for example, gamma ray counts, formation density measurements, or microresistivity measurements. The corresponding azimuth measurements may include a tool face angle with respect to a particular direction (e.g., borehole high side). The sensor measurements and corresponding azimuth measurements are commonly (although not necessarily) made during drilling and may be correlated at 204, for example, such that each data point in the sequence of LWD sensor measurements points is assigned an azimuth. The azimuth angle may be measured at substantially the same time as the directional resistivity measurement or interpolated, for example, from measurements made at other suitable times.

The data pairs residing in each of a plurality of azimuthal sectors (also referred to herein as azimuthal windows) may then be fit with corresponding mathematical fitting functions (e.g., n-th order polynomial equations) at 206. As described in more detail below, the use of first or second order polynomials is often sufficient in practical applications. At 208, these fitting functions are evaluated at one or more corresponding azimuthal positions (e.g., the azimuthal center point of the sector) to obtain a sensor value for each of the sectors. The processing in 206 and 208 is preferably performed downhole with the resultant values being stored in downhole memory and/or transmitted to the surface; however, the invention is not limited in this regard. As noted above, the raw data pairs acquired in 204 may alternatively be sent to the surface (e.g., via a high speed data link) then processed in 206 and 208 at the surface.

In general an image may be thought of as a two-dimensional representation of a parameter value determined at discrete positions. For the purposes of this disclosure, an LWD image may be thought of as a two-dimensional representation of an LWD sensor measurement (e.g., a density measurement or a microresistivity measurement) at discrete azimuths and borehole depths. Such images thus convey the dependence of the logging measurement on azimuth and depth. It will therefore be appreciated that one purpose in forming such images is to determine the actual azimuthal dependence of the logging measurement (and the corresponding formation properties) as a function of the borehole depth. Determination of the actual azimuthal dependence may enable a value of the formation parameter to be determined at substantially any arbitrary azimuth, for example via interpolation. The extent to which a measured image differs from the true azimuthal dependence may be thought of as image distortion. Such distortion may be related, for example, to statistical measurement noise and/or other effects, such as aliasing and bias. Notwithstanding, minimizing image distortion advantageously improves the usefulness of borehole images in determining the actual azimuthal dependence of the borehole parameters.

In order to minimize the above-described image distortion, formation data is typically accumulated for a predetermined number of drill string rotations, for a predetermined time (e.g., 10 seconds), or until a predetermined number of measurements have been made (e.g., 1000) at each discrete measured depth. In one exemplary serviceable embodiment of this invention, a logging measurement may be made at some predetermined frequency (e.g., at about 10 millisecond intervals). This measurement interval is preferably significantly less than the period of the tool rotation in the borehole (e.g., the measurement interval may be about 10 milliseconds or less while the rotational period of the tool may be about 0.5 seconds). Meanwhile, the azimuth sensor measures the azimuth angle of the tool, and correspondingly the azimuthal direction of the LWD sensor, as the tool rotates in the borehole. An azimuth angle may then be assigned to each LWD sensor measurement (i.e., to each measurement interval). The azimuth angle is preferably measured at each measurement interval, or often enough so that it may be determined (e.g., via interpolation) for each measurement interval, although the invention is not limited in this regard. It will thus be understood that each data pair typically includes an LWD sensor measurement and a corresponding azimuth measurement (a tool face angle).

The predetermined time interval during which the logging sensor measurements are acquired is typically significantly longer than both the above described measurement interval and the rotational period of the tool (e.g., the time interval may be 10 seconds, which is 1000 times longer than a 10 millisecond measurement interval and 20 times longer than a 0.5 second rotational period of the tool). As described above, the measurement interval is preferably kept short to maintain desired azimuthal resolution. The data acquired during a single time period (e.g., within the 10 second interval) typically represents a single "trace" of sensor data, i.e., a measurement at a single measured depth in the borehole. It will be appreciated that the invention is not limited to any particular time and/or measurement intervals. Nor is the invention limited to any particular number of data pairs per measured depth, although, it is typically advantageous to utilize 100 or more data pairs per measured depth so as to appropriately reduce measurement noise.

To form a two-dimensional image, it will be understood that measurements at multiple measured depths are required. Such measurements may be acquired, for example, during consecutive and/or sequential time periods (although the invention is not limited in this regard). For example, measurements made during a first 10 second time interval may be tagged with a first measured depth, while measurements made during a second 10 second time interval may be tagged with a second measured depth. The data pairs in each group may then be processed in accordance with the invention as described above.

It will also be understood that the invention is not limited to embodiments in which a single LWD sensor is utilized. Substantially any number of LWD logging sensors may be utilized. For example, a suitable logging tool may include multiple kinds of sensors so that multiple borehole images can be acquired simultaneously. A suitable logging tool may also include a plurality of distinct LWD sensors (e.g., multiple microresistivity electrodes) deployed at correspondingly distinct azimuthal positions on the tool body. The invention is not limited in any of these regards.

With continued reference to FIG. 2, a trace of sensor data may be acquired at 204 by acquiring a plurality of data pairs $(d_i, \phi_i)$, for example during rotation of the tool in the borehole as described above, where $d_i$ represents the i-th LWD sensor measurement in the trace and $\phi_i$ represents the corresponding azimuth angle associated with the i-th sensor measurement. At 206 the sensor data residing in each of p azimuthal windows $W_k$ corresponding to p azimuthal positions $\Phi_k$ (where k=0, 1, . . . p) may be fit with a corresponding fitting function $f_k(\phi)$.

Figure 3:
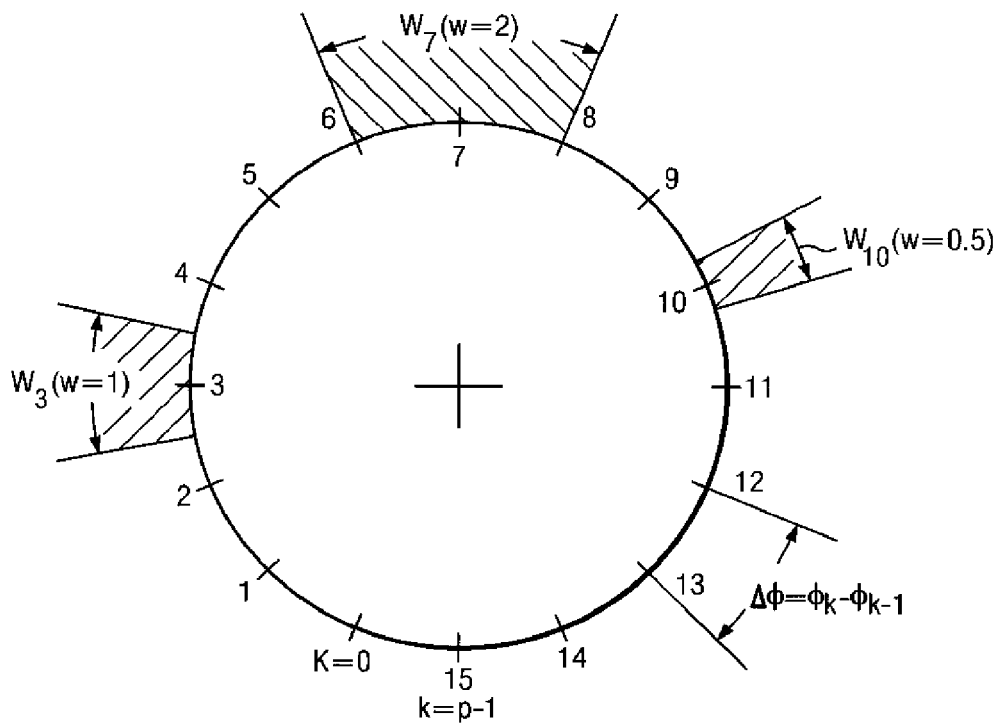
FIG. 3 schematically depicts a circular cross section of a borehole for the purposes of illustrating certain features of the present invention.

FIG. 3 schematically depicts a circular cross section of a borehole for the purposes of illustrating certain features of the present invention. In general, the borehole (or the circumference of the tool) may be represented by a plurality of discrete azimuthal positions $\Phi_k$. Typically, embodiments including 4 to 64 azimuthal positions are preferred (the embodiment shown in FIG. 3 includes 16 discrete azimuthal positions denoted as 0 through 15) depending upon the degree of compression and accuracy desired. However, the invention is not limited in this regard, as substantially any number of discrete azimuthal positions may be utilized. It will be appreciated that there is a tradeoff with increasing the number of azimuthal positions. Image quality (and in particular azimuthal resolution) tends to improve with an increasing number of azimuthal positions at the expense of requiring greater communication bandwidth between the downhole tool and the surface and/or greater data storage capacity.

With continued reference to FIG. 3, and assuming that the azimuthal positions are uniformly distributed about the circumference of the tool, the azimuth angle at each discrete azimuthal position $\Phi_k$ and the subtended circular angle between adjacent azimuthal positions $\Delta\Phi$ may be expressed mathematically, for example, as follows:

$$\Phi_k = \frac{2\pi}{p}k + \pi\left(\frac{2}{p} - 1\right), \quad \text{Equation 1}$$
$$k = 0, \ldots, p-1$$

$$\Delta\Phi = \Phi_k - \Phi_{k-1} = \frac{2\pi}{p} \quad \text{Equation 2}$$

where the subscript k is used to represent the individual azimuthal positions and p represents the total number of azimuthal positions about the circumference of the tool. While the above equations assume that the azimuthal positions are evenly distributed about the circumference of the tool, the invention is not limited in this regard. For example, if a heterogeneity in a formation is expected on one side of a borehole (e.g., from previous knowledge of the strata), the azimuthal positions may be chosen such that $\Delta\Phi$ on that side of the tool is less than $\Delta\Phi$ on the opposing side of the tool. Furthermore, the azimuthal positions $\Phi_k$ may be preselected (e.g., relative to high side) prior to execution of the inventive method. Alternatively, the azimuthal positions may be selected during execution of the method, for example, based on geological parameters (the location of a bed boundary or based on an analysis of the data pairs or previously obtained traces). The invention is not limited in any of these regards.

With further reference to FIG. 3, a corresponding azimuthal window $W_k$ is typically defined about each of the azimuthal positions $\Phi_k$. Azimuthal windows $W_k$ may be defined mathematically, for example, as follows:

$$\Phi_k - \frac{w\Delta\Phi}{2} < W_k \leq \Phi_k + \frac{w\Delta\Phi}{2} \quad \text{Equation 3}$$

where w is a positively valued parameter that defines the width of the window such that the width equals $\Delta\Phi$ when w=1, the width is greater than $\Delta\Phi$ when w>1, and the width is less than $\Delta\Phi$ when w<1. The parameter w is preferably in the range from about ½ to about 2, although the invention is not limited in this regard. FIG. 3 also depicts first, second, and third exemplary azimuthal windows $W_3$ (w=1), $W_7$ (w=2), and $W_{10}$ (w=0.5). These windows are presented purely for illustrative purposes. The first window is centered about azimuthal position $\Phi_3$ and has a width equal to $\Delta\Phi$ (since w=1). The second window is centered about azimuthal position $\Phi_7$ and has a width equal to $2\Delta\Phi$ (since w=2). The third window is centered about azimuthal position $\Phi_{10}$ and has a width equal to $\Delta\Phi/2$ (since w=0.5). It will be understood that the invention is not limited to azimuthal windows having any particular width and that there are trade offs in selecting a window width. An azimuthal window having a width equal to $\Delta\Phi$ preserves sensor data (i.e., the sensor data is neither over nor under sampled). An azimuthal window having a width greater than $\Delta\Phi$ over samples the data and may therefore advantageously improve the signal to noise ratio, especially when the data are noisy. An azimuthal window having a width less than $\Delta\Phi$ under samples the data and may better preserve azimuthal resolution in certain applications. Again, the invention is not limited to a particular azimuthal window width. Nor is the invention limited to embodiments in which the azimuthal position $\Phi_k$ is centrally located in the window $W_k$ as depicted on FIG. 3.

With reference again to FIG. 2, the fit may be obtained at 206 using substantially any suitable mathematical techniques. For example, a suitable fit may be obtained using a conventional least squares methodology in which:

$$\sum_{i \in W_k} [f_k(\phi_i) - d_i]^2 = \min \quad \text{Equation 4}$$

where $d_i$ and $\phi_i$, in combination, represent a data pair as described above, $f_k(\phi)$ represent the fitting functions corresponding to each of the azimuthal windows $W_k$, and $i \in W_k$ indicates that each of the fit data pairs resides within the window $W_k$.

In one exemplary embodiment of the invention, the fitting function $f_k(\phi)$ includes an n-th order polynomial equation:

$$f_k(\phi) = a_0 + a_1\phi + a_2\phi^2 + \ldots + a_n\phi^n \quad \text{Equation 5}$$

where $\phi$ represents the tool azimuth angle in the window $W_k$ and $a_0, a_1, a_2 \ldots a_n$ represent the polynomial coefficients that are utilized as fitting parameters. As described in more detail below with respect to FIGS. 4 and 5, first-order or second-order polynomials are often sufficient for practical applications.

With continued reference to FIG. 2, a sector value may be assigned to each of the windows (sectors) at 208 by evaluating the corresponding fitting functions at the corresponding azimuthal positions (i.e., at $\phi = \Phi_k$). This may be expressed mathematically, for example, as follows:

$$D_k = f_k(\Phi_k) \quad \text{Equation 6}$$

where $D_k$ represents the trace of sensor data including k sensor values, binned in accordance with the present invention.

Equation 6 describes one exemplary embodiment of the invention in which each fitting functions $f_k(\phi)$ is evaluated at a single corresponding azimuthal position $\Phi_k$ (e.g., the central position in each of the windows) such that the trace of sensor data includes a single sensor value per window. The invention is expressly not limited in this regard. As shown below in Equation 7, the fitting function $f_k(\phi)$ may be evaluated at substantially any number of distinct azimuthal positions $\Phi_k^m$:

$$D_k^m = f_k(\Phi_k^m) \quad \text{Equation 7}$$

where m is a positive integer and $D_k^m$ represents the trace of sensor data, including m·k sensor values, binned in accordance with the present invention.

As described above, the computed sensor values are typically stored to downhole memory and/or transmitted to the surface. In one advantageous embodiment of the invention, a trace of sensor data may be computed downhole in accordance with Equation 7 (i.e., including m sensor values per window) and saved to downhole memory. A selected few of the sensor values (e.g., a single sensor value per window) may also be transmitted to the surface in substantially real-time during drilling. The invention is, of course, not limited in these regards.

In an alternative embodiment of the invention, step 206 (FIG. 2) may be performed downhole, while step 208 is performed at the surface. For example, the fitting coefficients obtained at 206 (e.g., $a_0, a_1, \ldots$ obtained via Equations 4 and 5) may be transmitted to the surface where they may be evaluated at 208, e.g., via computing $D_k^m$. This may advantageously enable images having a high azimuthal resolution to be obtained at the surface in substantially real time during drilling. For example, second order polynomial equations may be utilized to fit the sensor data grouped into each of four azimuthal windows. The resulting 12 fitting coefficients ($a_0$, $a_1$, and $a_2$ in each of the four windows) may be transmitted to the surface and utilized to compute a trace of sensor data $D_k^m$ having substantially any number of sensor values (e.g., $D_k^m$ may include 36 sensor values when m=9 and k=4). In this example, the number of sensor values that may be reliably computed at the surface tends to be limited only by the quality of the fit obtained downhole at 206 and the accuracy of transmitting the fitting coefficients to the surface.

Figure 4:
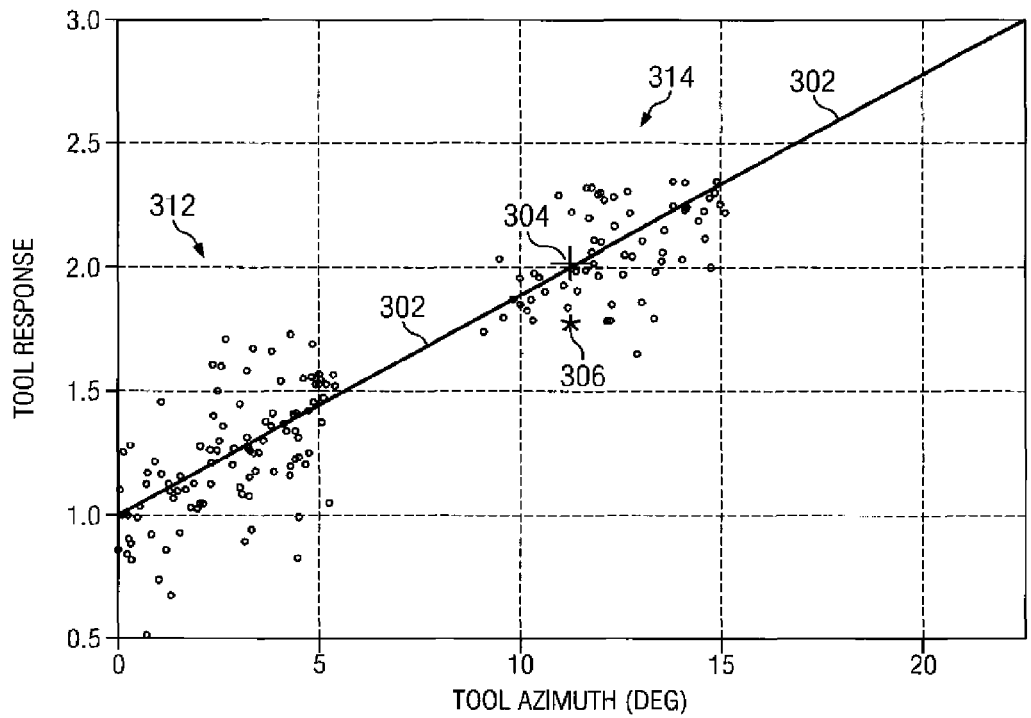
FIG. 4 depicts a comparative example in which the present invention is contrasted with conventional binning.
Figure 5:
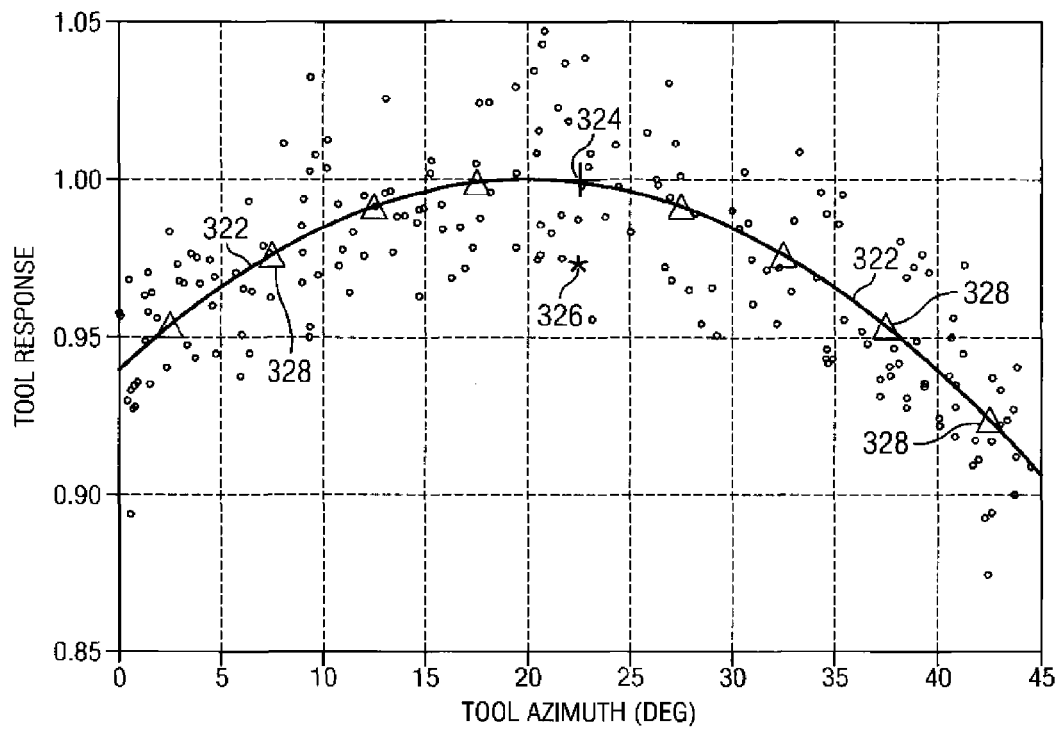
FIG. 5 depicts another comparative example in which the present invention is contrasted with conventional binning.

Certain advantages of the invention are now described in more detail with respect to FIGS. 4 and 5. FIG. 4 depicts an example in which the present invention is compared with a conventional binning methodology for an embodiment having 16 azimuthal positions. A plot of tool response on the vertical axis versus azimuth angle on the horizontal axis is depicted for a single window (sector) having an azimuth in the range from 0 to 22.5 degrees (0 to $\pi/8$ radians). In this example, each data pair is represented by the "o" symbol. The data may be fit, for example, to a first order polynomial (a linear function represented, for example, by: $f_k(\phi) = a_0 + a_1\phi$) via Equation 4. A linear function is often a good approximation for small angle windows (e.g., windows having a width of less than about 30 degrees). The exemplary fitting function is represented by a solid line as indicated at 302.

In the exemplary embodiment depicted, the data pairs are not evenly distributed in azimuth. Rather, they are clustered in two groups 312 and 314. Such clustering can result from an interaction between the data sampling rate, the rotation rate of the tool, and the time period over which data is collected for a single trace. For example, a data acquisition scheme having a 5 millisecond sampling rate (200 data pairs per second) over a time period of 1 second (for a total of 200 data points) at a tool rotation rate of 114 rpm results in 21 data clusters distributed in azimuth about the circumference of the tool. Such data clustering can significantly degrade the accuracy of conventional binning.

The fitting function 302 may be evaluated in accordance with the present invention at an azimuth of 11.25 degrees as indicated by the "+" symbol at 304 to obtain a sector value. The average value obtained via conventional binning is indicated by the "*" symbol at 306. As can be seen, the present invention provides an accurate sector value based on a mathematical fit of the data pairs that reside in the window (i.e., in the sector). In this particular example, conventional binning significantly underestimates the true response at the center of the sector. Moreover, the present invention advantageously accounts for the data clustering observed in the data.

FIG. 5 depicts an example in which the present invention is compared with conventional binning for an embodiment having 8 azimuthal positions (sectors). FIG. 5 again includes a plot of tool response on the vertical axis versus azimuth angle on the horizontal axis for a single window. In this example, the window has an azimuth in the range from 0 to 45 degrees (0 to $\pi/4$ radians). Each data pair is again represented by the "o" symbol. The data pairs in FIG. 5 are fit to a second order polynomial (a quadratic function represented, for example, by: $f_k(\phi) = a_0 + a_1\phi + a_2\phi^2$) via Equation 4. Since the azimuthal response of the logging sensor is periodic, the sensor response must be nonlinear over the full circumference of the tool. Thus nonlinearity may appear in an individual sector, especially in wide angle windows (e.g., windows having a width of greater than about 30 degrees), and can significantly degrade the accuracy of conventional binning methodologies. A second order polynomial function is often a good approximation of such nonlinearity (although the invention is not limited in this regard). The exemplary fitting function in this example is represented by a solid line as indicated at 322.

The fitting function 322 may be evaluated in accordance with the present invention using Equation 6 at an azimuth of 22.5 degrees as indicated by the "+" symbol at 324 to obtain a sector value. The fitting function may also be evaluated in accordance with the present invention using Equation 7, e.g., at azimuthal increments of 5 degrees as indicated by the "Δ" symbols at 328 and the "+" symbol at 324. The average value obtained via conventional binning is indicated by the "*" symbol at 326. As can be seen, the present invention tends to provide one or more accurate sector values based on a mathematical fit of the data pairs that reside in the window. In this particular example, conventional binning significantly underestimates the true response at the center of the sector as indicated. Moreover, the present invention advantageously accounts for nonlinearity of the data in an individual sector, which is commonly observed in LWD imaging operations using a small number of sectors.

It will also be appreciated that embodiments of this invention may be utilized in combination with substantially any other known methods for correlating the above described time dependent sensor data with depth values of a borehole. For example, the traces obtained in method 200 may be tagged with a depth value using known techniques used to tag other LWD data. The tagged data may then be plotted as a function of azimuthal position and depth to generate an image.

It will be understood that the aspects and features of the present invention may be embodied as logic that may be processed downhole using a microprocessor, hardware, firmware, programmable circuitry, or any other processing devices and methodologies known in the art. Similarly the logic may be embodied on software suitable to be executed by a downhole processor, as is also well known in the art. The invention is not limited in this regard. The software, firmware, and/or processing device may be included, for example, on a downhole assembly in the form of a circuit board, on board a sensor sub, or MWD/LWD sub. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for forming an image of a logging sensor measurement, the method comprising:
    (a) rotating a downhole tool in a borehole, the tool including at least one logging sensor and at least one azimuth sensor,
    (b) causing the at least one logging sensor and the at least one azimuth sensor to acquire a plurality of data pairs, each data pair comprising a logging sensor measurement and a corresponding azimuth;
    (c) fitting the data pairs that reside in each of a plurality of predetermined azimuthal windows with a corresponding fitting function; and
    (d) evaluating the fitting functions generated in (c) at corresponding azimuthal positions to obtain corresponding sector values for each of the azimuthal positions.

2. The method of claim 1, wherein the fitting in (c) and the evaluating in (d) are performed downhole.

3. The method of claim 1, wherein the plurality of azimuthal windows in (c) comprises from 4 to 64 azimuthal windows.

4. The method of claim 1, wherein the fitting functions generated in (c) comprise polynomial functions.

5. The method of claim 1, wherein the fitting functions generated in (c) comprise first or second order polynomial functions.

6. The method of claim 1, wherein the fitting functions are generated in (c) according to the following mathematical equation:

$$\sum_{i \in W_k} [f_k(\phi_i) - d_i]^2 = \min$$

wherein $d_i$ represents the logging sensor measurement in the i-th data pair and $\phi_i$, represents the corresponding azimuth angle such that $d_i$ and $\phi_i$, in combination represent the plurality of data pairs, $f_k(\phi)$ represents the fitting functions corresponding to each of the azimuthal windows $W_k$, and $i \in W_k$ indicates that each of the data pairs resides within the azimuthal window $W_k$.

7. The method of claim 1, wherein the fitting functions are evaluated in (d) according to the following mathematical equation:

$$D_k^m f_k(\Phi_k^m)$$

wherein $f_k(\cdot)$ represent the fitting functions, $\Phi_k^m$ represent the azimuthal positions, $D_k^m$ represent the sector values, and m is a positive integer.

8. The method of claim 1, wherein the azimuthal windows in (c) are defined according to the following mathematical equation:

$$\Phi_k - \frac{w\Delta\Phi}{2} < W_k \leq \Phi_k + \frac{w\Delta\Phi}{2}$$

wherein $W_k$ represent the azimuthal windows, $\Phi_k$ represent the azimuthal positions, $\Delta\Phi$ represents a subtended circular angle between adjacent azimuthal positions $\Phi_k$ and $\Phi_{k-1}$ and w is a positively valued parameter that defines an angular width of the azimuthal windows such that the width equals $\Delta\Phi$ when w=1.

9. The method of claim 1, further comprising at least one of the following:
    (e) storing the sensor measurement values obtained in (d) to downhole memory; and
    (f) transmitting selected ones of sensor measurement values obtained in (d) to a surface location.

10. The method of claim 1, wherein:
    (c) further comprises: (i) fitting the data pairs that reside in each of a plurality of predetermined azimuthal windows with a corresponding fitting function to obtain a plurality of fitting coefficients and (ii) transmitting the fitting coefficients to a surface location; and
    the evaluating in (d) is performed at the surface location.

11. The method of claim 1, further comprising:
    (e) repeating (b), (c), and (d) at a plurality of distinct measured depths in the borehole.

12. The method of claim 1, wherein the downhole logging tool acquires the plurality of data pairs in (b) during rotation of the tool in (a).

13. A method for making a downhole directional resistivity measurement, the method comprising:
    (a) rotating a downhole tool in a borehole, the tool including at least one logging sensor and at least one azimuth sensor,
    (b) causing the at least one logging sensor and the at least one azimuth sensor to acquire a plurality of data pairs, each data pair comprising a logging sensor measurement and a corresponding azimuth;
    (c) fitting the data pairs that reside in each of a plurality of predetermined azimuthal windows with a corresponding fitting function;

(d) evaluating the fitting functions generated in (c) at corresponding azimuthal positions to obtain corresponding sector values for each of the azimuthal positions; and (e) repositioning the downhole tool and rotating it at a second longitudinal position in the borehole and repeating (b), (c), and (d).

14. The method of claim 13, wherein the processing in (c), (d), and (e) is performed downhole.

15. The method of claim 13, further comprising:

(f) assigning a first measured depth value to the sector values obtained in (d) and a second measured depth value to the sector values obtained in (e).

16. The method of claim 13, wherein the fitting functions are evaluated in (d) according to the following mathematical equation:

$$D_k^m = f_k(\Phi_k^m)$$

wherein $f_k(\cdot)$ represent the fitting functions, $\Phi_k^m$ represent the azimuthal positions, $D_k^m$ represent the sector values, and m is a positive integer.

17. The method of claim 13, wherein the azimuthal windows in (c) are defined according to the following mathematical equation:

$$\Phi_k - \frac{w\Delta\Phi}{2} < W_k \leq \Phi_k + \frac{w\Delta\Phi}{2}$$

wherein $W_k$ represent the azimuthal windows, $\Phi_k$ represent the azimuthal positions, $\Delta\Phi$ represents a subtended circular angle between adjacent azimuthal positions $\Phi_k$ and $\Phi_{k-1}$, and w is a positively valued parameter that defines an angular width of the azimuthal windows such that the width equals $\Delta\Phi$ when w=1.

18. The method of claim 13, further comprising at least one of the following:

(f) storing the sector values obtained in (d) and (e) in downhole memory; and (g) transmitting selected ones of the sector values obtained in (d) and (e) to a surface location.

19. A logging while drilling tool comprising:

a logging while drilling tool body;

at least one logging while drilling sensor deployed on the tool body;

at least one azimuth sensor deployed on the tool body; and a controller configured to (i) cause the tool to acquire a plurality of data pairs while rotating in a subterranean borehole, each data pair comprising a logging sensor measurement and a corresponding azimuth angle; (ii) fit the data pairs that reside in each of a plurality of predetermined azimuthal windows with a corresponding fitting function; and (iii) evaluate the fitting functions generated in (ii) at corresponding azimuthal positions to obtain corresponding sector values for each of the azimuthal positions.

20. The measurement tool of claim 19, wherein the controller is further configured to (iv) repeat (i), (ii), and (iii); and (v) assign a first measured depth value to sector values obtained in (iii) and a second measured depth value to the sector values obtained in n (iv).

21. The measurement tool of claim 19, wherein the controller is further configured to perform at least one of the following steps:

(iv) store the sector values obtained in (iii) in downhole memory; and (v) transmit selected ones of the sector values obtained in (iv) to a surface location.

22. The downhole tool of claim 19, wherein the logging while drilling sensor comprises a member of the group consisting of gamma ray sensors, neutron sensors, density sensors, directional resistivity sensors, microresistivity sensors, physical caliper sensors, ultrasonic caliper sensors, formation pressure sensors, annular pressure sensors, ultrasonic sensors, and audio-frequency acoustic sensors.

* * * * *